United States Patent [19]

Gray

[11] Patent Number: 5,545,380
[45] Date of Patent: Aug. 13, 1996

[54] CORONA DISCHARGE SYSTEM WITH CONDUIT STRUCTURE

[75] Inventor: Buddy D. Gray, Giles County, Tenn.

[73] Assignee: Teledyne Industries, Inc., Huntsville, Ala.

[21] Appl. No.: 16,145

[22] Filed: Feb. 5, 1993

[51] Int. Cl.[6] ........................................ B01J 19/08
[52] U.S. Cl. .............................. 422/186.07; 422/186.18; 422/906; 422/907
[58] Field of Search ............ 422/186.07, 186.18, 422/906, 907

[56] References Cited

U.S. PATENT DOCUMENTS

| | | | |
|---|---|---|---|
| 648,764 | 5/1900 | Lamprey | 422/186.07 |
| 927,519 | 7/1909 | Friedlander | 422/186.07 |
| 1,326,631 | 12/1919 | Bayeux et al. | 422/186.07 |
| 3,405,052 | 10/1968 | Schirmer | 204/312 |
| 3,865,733 | 2/1975 | Taylor | 250/532 |
| 4,770,858 | 9/1988 | Colllins | 422/186.18 |
| 4,869,881 | 9/1989 | Collins | 422/186.18 |
| 4,940,894 | 7/1990 | Morters | 250/324 |
| 5,413,769 | 5/1995 | Okazaki et al. | 422/186.07 |

*Primary Examiner*—Charles T. Jordan
*Assistant Examiner*—Daniel Jenkins
*Attorney, Agent, or Firm*—Dickstein, Shapiro & Morin, L.L.P

[57] ABSTRACT

A flow-through type ozone generating system has a fluid conduit and a source of alternating current for generating a corona discharge. An insulated wire may be used as an electrode within the conduit. PTFE is advantageously used as a dielectric material.

17 Claims, 4 Drawing Sheets

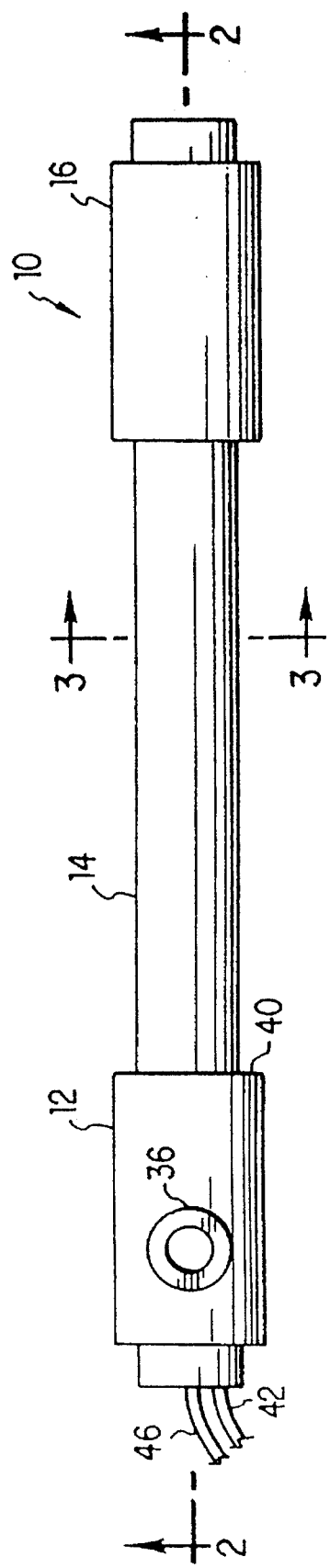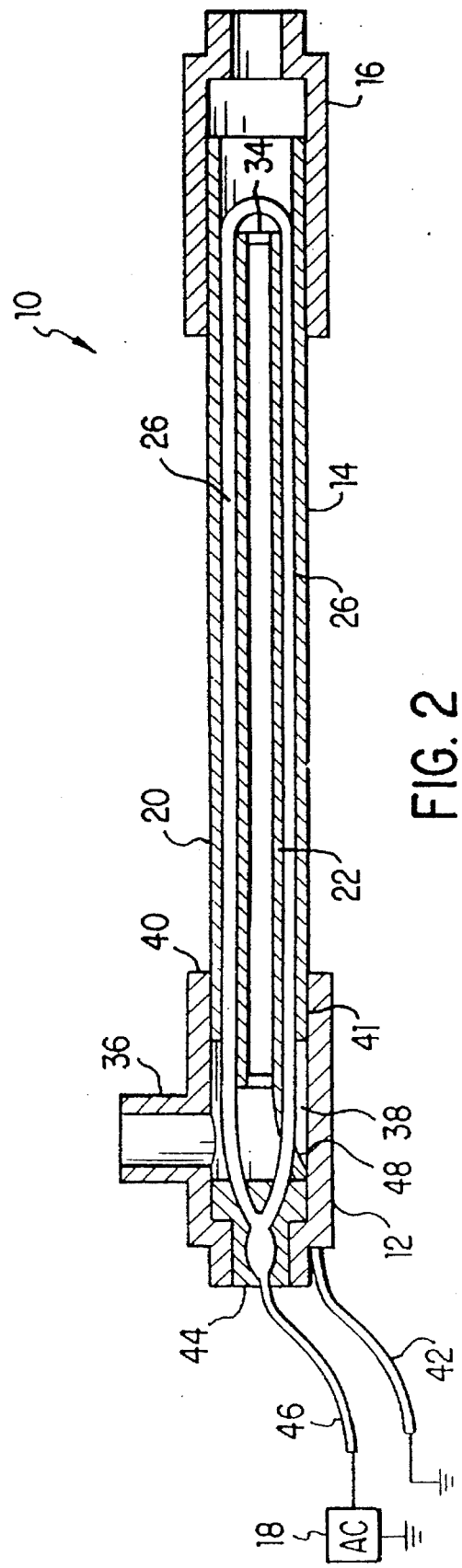

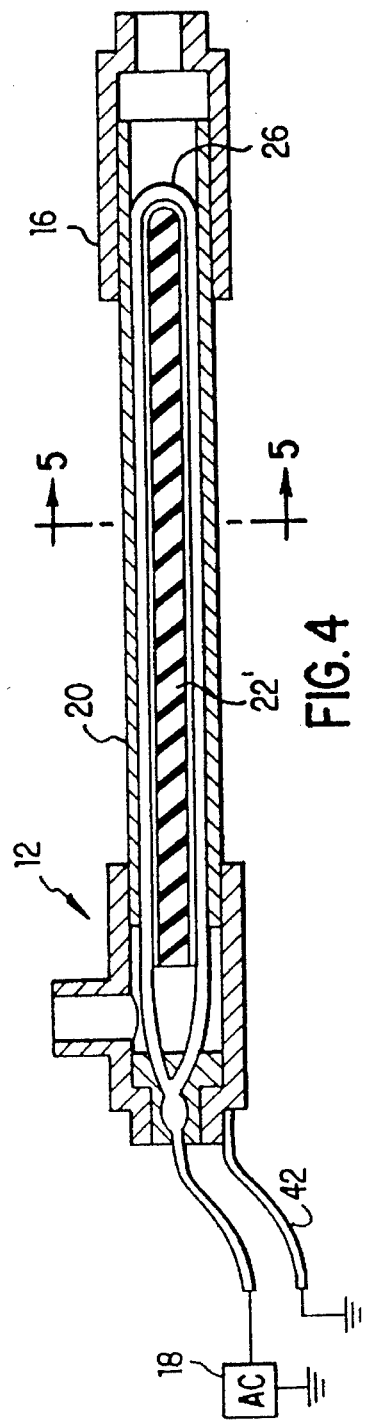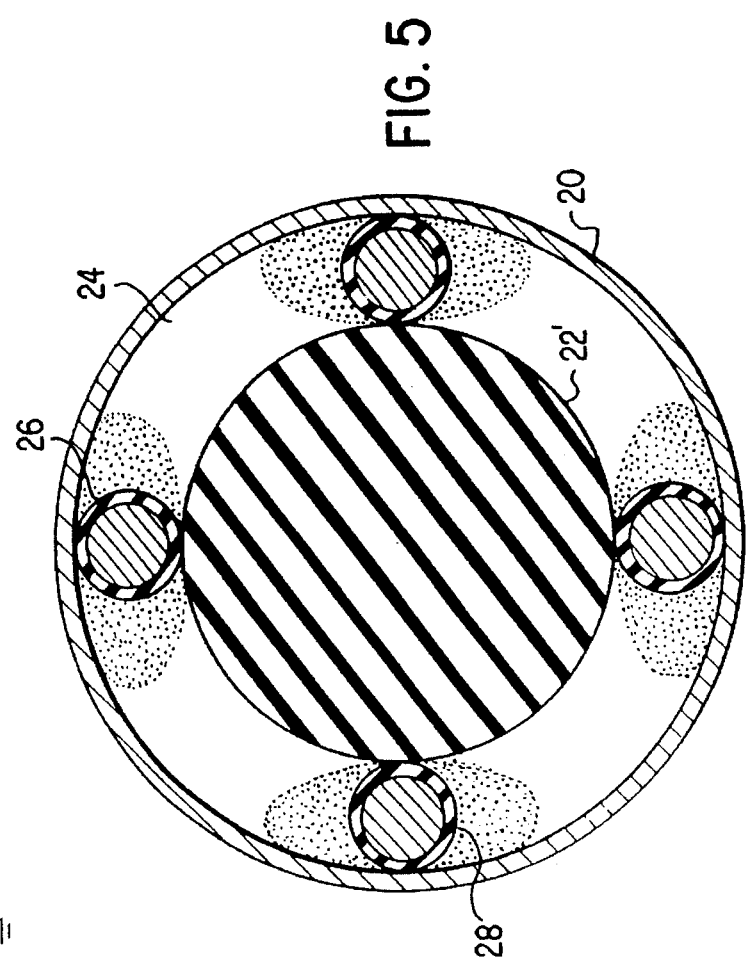

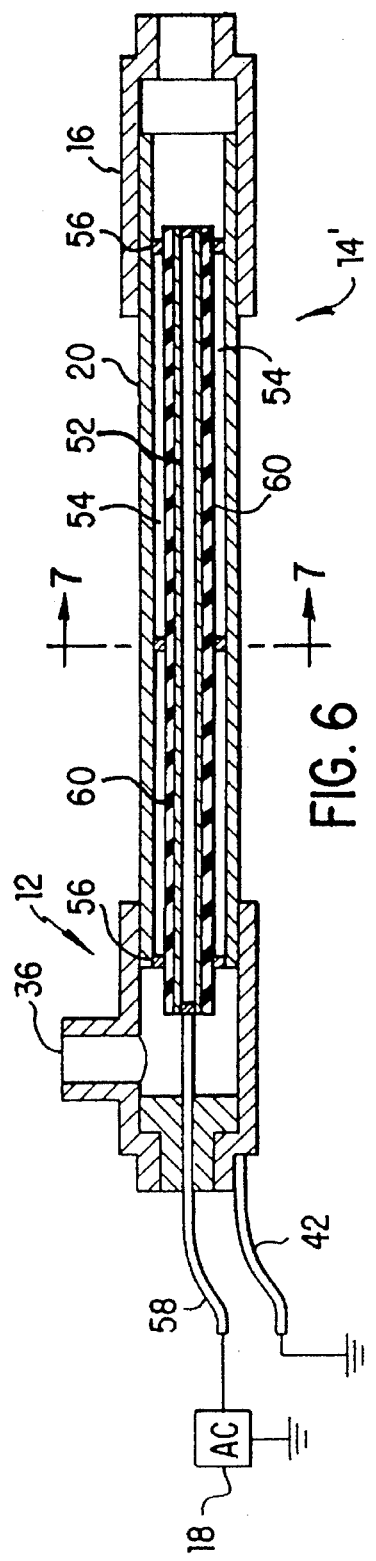
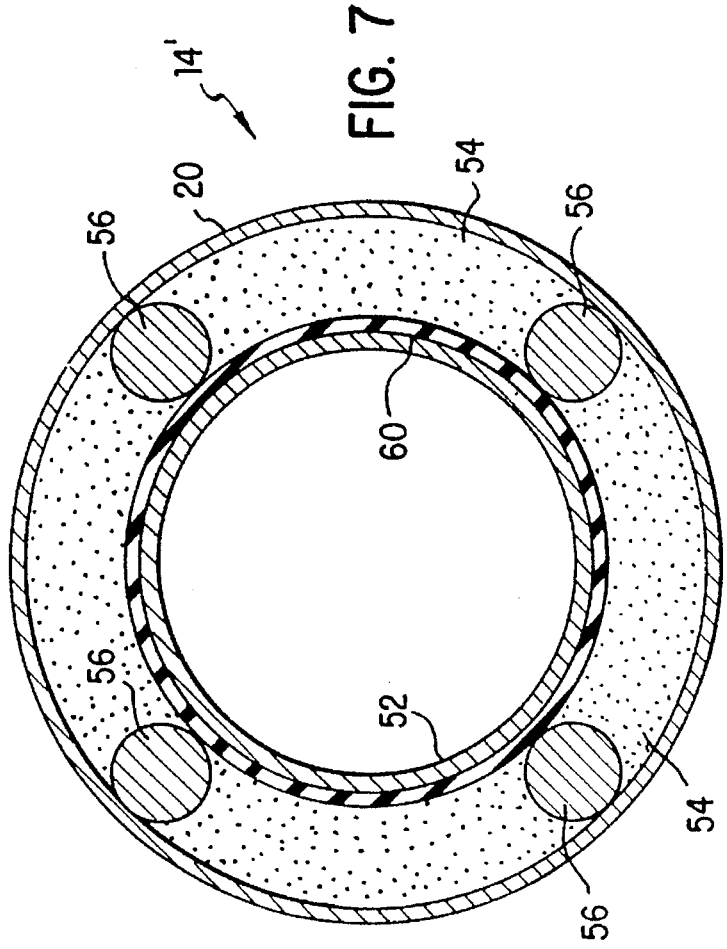

5,545,380

CORONA DISCHARGE SYSTEM WITH CONDUIT STRUCTURE

BACKGROUND OF THE INVENTION

1. Field of the Invention

The present invention relates to a system for generating a corona discharge. The present invention particularly relates to a flow-through corona discharge system for producing ozone.

2. Description of the Related Art

Known systems for producing ozone are formed of plates and tubes, and conventionally use glass as a dielectric material. Other known systems utilize water electrolysis and ultraviolet light irradiation. Flow-through corona discharge type ozone generating systems are disclosed in U.S. Pat. Nos. 3,942,020 (Ciambrone), 3,967,131 (Slipiec), 4,774,062 (Heinemann), 4,986,968 (Hirth), and 5,087,428 (Fletcher).

The known systems are generally tailored for high rates of ozone production, and are disadvantageous because they are complex and require too much power. The known systems are also generally heavy and fragile. As a result, the known systems are not well suited for use in space flight systems, or in other systems where ruggedness and efficiency are at a premium. Moreover, the known systems are disadvantageous because they utilize hazardous components and produce hazardous by-products.

SUMMARY OF THE INVENTION

The disadvantages of the prior art are alleviated to a great extent by the present invention which provides a corona discharge system having a fluid conduit, at least one insulated wire located within the conduit, and a source of alternating current connected to the wire for generating a corona discharge within the conduit.

In one aspect of the present invention, the fluid conduit is arranged to conduct a gas from an inlet to an outlet though the corona discharge.

In a preferred embodiment of the invention, the wires may be insulated by polytetrafluoroethylene ("PTFE").

In another aspect of the invention, a corona discharge unit has a conduit structure with a PTFE dielectric material, and means for connecting an element of the conduit structure to a source of alternating current.

An object of the present invention is to provide a corona discharge system that can be constructed on a small scale, and that is capable of efficiently producing relatively small quantities of ozone.

Another object of the invention is to provide a rugged, lightweight, and efficient system for generating ozone.

Another object of the invention is to provide an improved method of producing ozone.

Other objects and advantages of the present invention will become apparent from the following description and drawings which illustrate preferred embodiments of the present invention.

BRIEF DESCRIPTION OF THE DRAWINGS

FIG. 1 is a top view of a corona discharge system constructed in accordance with the present invention.

FIG. 2 is a cross sectional view taken along the line 2—2 of FIG. 1.

FIG. 4 is a cross sectional view like FIG. 2, but of another corona discharge system constructed in accordance with the present invention.

FIG. 5 is a cross sectional view taken along the line 5—5 of FIG. 4.

FIG. 6 is a cross sectional view like FIGS. 1 and 4, but of still another corona discharge system constructed in accordance with the present invention.

FIG. 7 is a cross sectional view taken along the line 7—7 of FIG. 6.

DETAILED DESCRIPTION OF PREFERRED EMBODIMENTS

Figure 3:
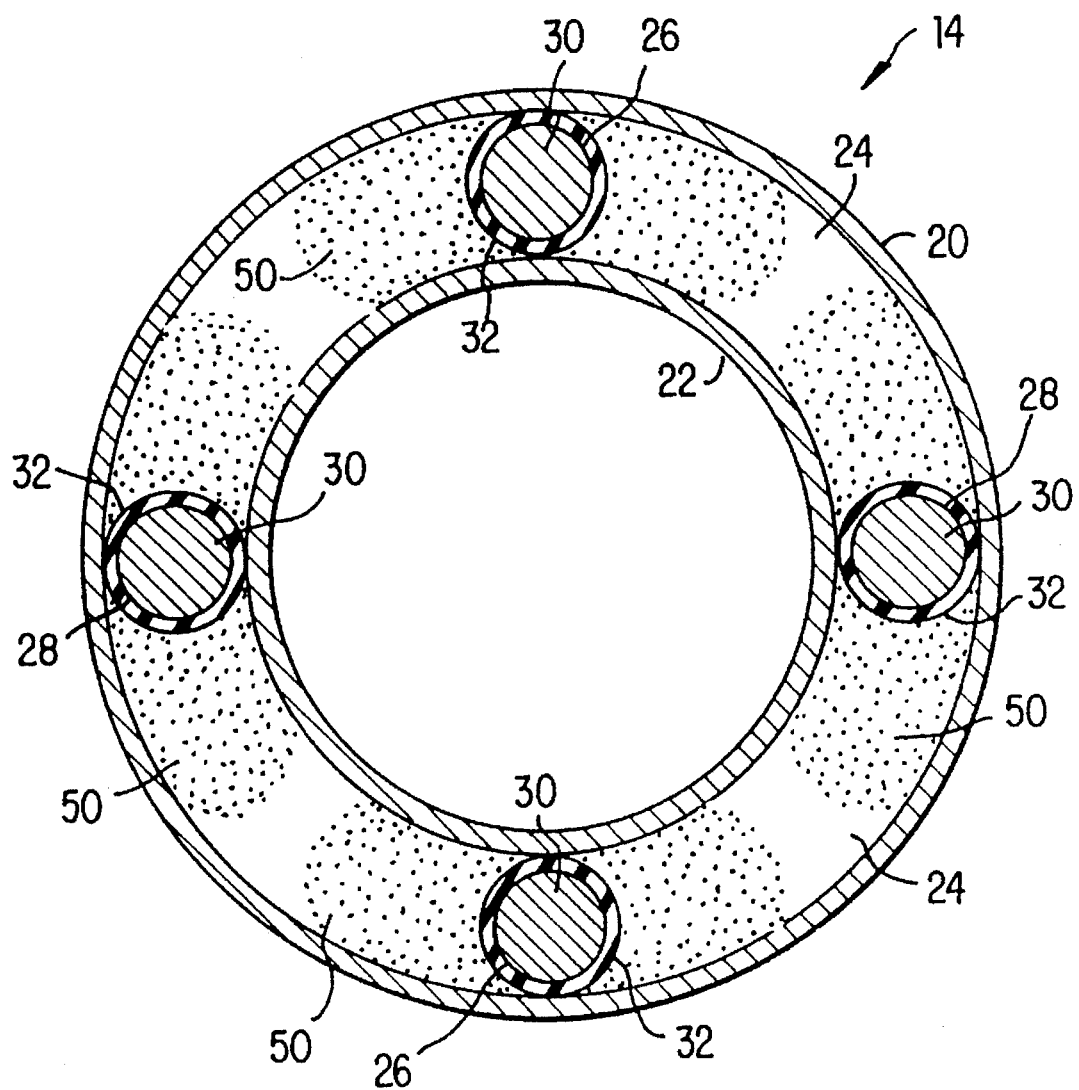
FIG. 3 is a cross sectional view taken along the line 3—3 of FIG. 1.

Referring now to the drawings, there is shown in FIGS. 1 and 2 a corona discharge system 10 constructed in accordance with the present invention. The corona discharge system 10 includes an inlet housing 12, a conduit structure 14, an outlet housing 16, and a source 18 (FIG. 2) of high voltage alternating current. In operation, a corona discharge is generated within the conduit structure 14, such that ozone is produced from oxygen-rich gas flowing through the conduit structure 14 from the inlet housing 12 to the outlet housing 16, as described in more detail below.

As illustrated in detail in FIG. 3, the conduit structure 14 has an outer wall 20 and a concentric inner spacer member 22. An elongated annular space 24 is formed between the outer wall 20 and the spacer member 22. In the illustrated embodiment, the outer wall 20 and the spacer member 22 are both formed of metal, or another suitable conductive material.

At least one insulated wire is located within the conduit structure's annular space 24. The embodiment illustrated in the drawings has two such wires 26, 28. But only one wire may be required. As illustrated in FIG. 3, each of the wires 26, 28 is formed of a central wire 30 and a dielectric layer or cover 32. The central wires 30 may be formed of aluminum or copper, or of any other suitable electrically conductive material.

In a preferred embodiment of the invention, the dielectric material 32 is integrally formed directly on the exterior surfaces of the wires 30, such that there are no gaps between the interior surfaces of the dielectric layers 32 and the exterior surfaces of the wires 30, and such that the wires 30 are each completely surrounded by the dielectric material 32. The central wires 30 and dielectric material 32 may be economically taken from a very long stock supply of pre-fabricated, flexible, insulated wire. Each central wire 30 may have a solid circular cross section so as to reduce the complexity and expense of the system 10, and to make it easier to manufacture the system 10.

The dielectric material 32 may be formed of an ozone-resistant polymer. Fluorine-containing polymers are preferred because of their inertness, ruggedness, flexibility, processibility, and commercial availability. Particularly satisfactory results are achieved when the dielectric material 32 is formed essentially entirely of a commercially available polytetrafluoroethylene ("PTFE") polymer.

As illustrated in FIG. 2, the insulated wire 26 extends longitudinally through the annular space 24 from the inlet housing 12 to the outlet housing 16, is bent around the end 34 of the spacer member 22, and extends longitudinally from the outlet housing 16 to the inlet housing 12. The other wire 28 (only visible in FIG. 3) also extends in both directions through the annular chamber 24, and is bent around the end 34 of the spacer member 22. The dimensions of the spacer member 22 and the insulated wires 26, 28 are such that the wires 26, 28 fit snugly within the annular space 24, such that the wires 26, 28 will not inadvertently move out of position.

The inlet housing 12 includes an inlet fitting 36, a central chamber 38, and a connector 40. An inlet end 41 of the outer wall 20 fits within the connector 40. The inlet housing 12 may be used to provide an electrical connection between the outer wall 20 and a ground lead 42. The wires 26, 28 fit through a bushing 44 and are connected to a lead 46 which is in turn connected to the current source 18. The bushing 44 electrically isolates the wires 26, 28 from the electrically conductive portion of the inlet housing 12. The flexibility of the wires 26, 28 makes it easy to assemble the wires 26, 28 through the bushing 44. The spacer member 22 is electrically connected to the grounded central chamber 38 by a suitable lead 48.

The present invention is not limited to the specific instrumentalities shown and described herein. The connection of the current source and the grounding of the electrodes located within the conduit structure 14 may be accomplished through the outlet housing 16, or through other suitable means.

The outlet housing 16 may be connected to a system which utilizes ozone, such as a water purification system. For clarity of illustration, the outer periphery of the outlet housing 16 is not shown in FIG. 3.

In operation, the source 18 supplies high voltage alternating current to the central wires 30 of the insulated wires 26, 28. As a result, a corona discharge 50 (FIG. 3) is generated between the outer wall 20 and the spacer member 22 in the vicinity of the insulated wires 26, 28. An oxygen-rich gas, such as air, is then caused to flow through the inlet fitting 36 and through the annular space 24 to the outlet housing 16. Ozone is produced as the oxygen-rich gas flows through the corona discharge 50.

Advantageously, the center of the spacer member 22 is closed off such that gas to be ozonated flows only through the annular space 24. This optimizes the effectiveness of the corona discharge 50, which is strongest in the vicinity of the wires 26, 28.

The corona discharge 50 causes the ionization of oxygen-rich gas by converting $O_2$ to $O_3$, and $O_3$ to $O_2$. The chemical formulas for this process, assuming pure oxygen as the feed gas are:

$$e^{-1}+O_2 \rightarrow 2O+e^{-1}, \quad (1)$$

$$O+O_2 \rightarrow O_3 \text{ (or } O+O+O \rightarrow O_3), \quad (2)$$

$$e^{-1}+O_3 \rightarrow O_2+O+e^{-1} \text{ (also } O+O_3 \rightarrow 2O_2). \quad (3)$$

Formulas (1) through (3) show the destruction of ozone as well as its generation. However, the rate of ozone generation exceeds the rate of ozone destruction.

Another embodiment of the present invention is illustrated in FIGS. 4 and 5, with like reference numerals indicating like elements. In the FIGS. 4 and 5 embodiment, the spacer member 22' is not grounded and is not hollow. The FIGS. 4 and 5 embodiment is otherwise identical to the embodiment illustrated in FIGS. 1 through 3.

The corona discharge systems illustrated in FIGS. 1–5 are shown with only two electrode wires 26, 28. The wires 26, 28 are separated from each other through arcs of approximately ninety degrees. In practice, a much larger number of electrode wires may be used. The relative dimensions of the electrode wires and the spacings between the wires may be selected to optimize the efficiency with which the systems produce ozone.

Still another embodiment of the invention is illustrated in FIGS. 6 and 7, again with like reference numerals indicating like elements. The embodiment illustrated in FIGS. 6 and 7 has a conduit structure 14' with an outer wall 20 and a concentric inner electrode element 52. An annular space 54 is formed between the outer wall 20 and the inner element 52. The center of the inner element 52 may be sealed off such that gas flows only through the annular space 54. The concentric inner element 52 may be held in position within the outer wall 20 by suitable spacer elements 56.

In the embodiment illustrated in FIGS. 6 and 7, the outer wall 20 and the concentric element 52 are both formed of metal, or another suitable conductive material. The outer wall 20 is connected to ground through a suitable lead 42. The concentric element 52 is connected, by another suitable lead 58, to a source 18 of high voltage alternating current.

The inner concentric element 52 is completely surrounded by a dielectric material 60. The dielectric material 60 is preferably integrally formed directly on the exterior surface of the concentric element 52, such that there are no gaps between the interior surface of the dielectric material 60 and the exterior surface of the concentric element 52. The dielectric material 60 may be conveniently formed with a uniform thickness.

The dielectric material 60 may be formed of an ozone-resistant polymer. Fluorine-containing polymers are preferred because of their inertness, ruggedness, flexibility, processibility, and commercial availability. Particularly satisfactory results are achieved when the dielectric material 60 is formed essentially entirely of a commercially available PTFE polymer.

In operation, the source 18 supplies high voltage alternating current to the insulated concentric element 52. As a result, a corona discharge is generated between the outer wall 20 and the dielectric material 60. An oxygen-rich gas, such as air, is then caused to flow through the annular space 24 from the inlet fitting 36 to the outlet housing 16. Ozone is produced as the oxygen-rich gas flows through the corona discharge generated within the annular space 54.

The present invention is particularly well suited for producing small amounts of ozone for use in space flight water purification systems. In particular, the present invention may be easily configured to efficiently produce ozone at a rate below the safety limits imposed by manned spacecraft. However, the invention is also scaleable for higher and lower production rates. The present invention will be useful in space flight systems as well as in ground based systems.

The present invention is especially well suited for generating ozone from air. But the invention may be used to generate ozone from any oxygen-rich gas.

The above description and drawings are only illustrative of preferred embodiments which achieve the objects, features and advantages of the present invention, and it is not intended that the present invention be limited thereto. Any modifications of the present invention coming within the spirit and scope of the following claims is to be considered part of the present invention.

What is claimed as new and desired to be protected by Letters Patent of the United States is:

1. A corona discharge system, comprising:
   a conduit for containing a fluid, said conduit including an outer wall and a spacer member located within said outer wall;

a wire located within said conduit between said outer wall and said spacer member;

a dielectric material surrounding said wire; and a source of alternating current connected to said wire for generating a corona discharge within said conduit; and wherein said dielectric material is in contact with said spacer member and said outer wall.

2. The corona discharge system of claim 1, wherein said outer wall and said spacer member define an annular space for containing the fluid, and wherein said wire extends substantially longitudinally through said annular space.

3. The corona discharge system of claim 2, wherein said outer wall of said conduit is formed of an electrically conductive material.

4. The corona discharge system of claim 2, wherein said spacer member is formed of an electrically conductive material.

5. The corona discharge system of claim 2, wherein said dielectric material is formed of a fluorine-containing polymer.

6. The corona discharge system of claim 5, wherein said fluorine-containing polymer is polytetrafluoroethylene.

7. A system for generating ozone, said system comprising:

a fluid conduit system including an inlet, an outlet, and a conduit for conducting a gas from said inlet to said outlet, said conduit including an outer wall and a spacer member, said outer wall including a first electrode;

a plurality of insulated wires supported by said spacer member within said conduit, said plurality of insulated wires including a second electrode; and a source of alternating current connected to said second electrode for generating a corona discharge between said spacer member and said outer wall; and wherein said insulated wires are in contact with said spacer member and said outer wall.

8. The system of claim 7, wherein each one of said insulated wires includes a central wire and a dielectric material, with said dielectric material being integrally formed on said central wires, and wherein said dielectric material is an ozone-resistant polymer, and wherein said dielectric material is in contact with said spacer member and said outer wall, and wherein said dielectric material fits snugly against said spacer member and said outer wall to prevent said insulated wires from moving out of position, whereby said outer wall, said spacer member and said insulated wires define flow conduits for confining said gas between said inlet and said outlet, said flow conduits being substantially parallel to said insulated wires.

9. The system of claim 8, wherein said ozone-resistant polymer is polytetrafluoroethylene.

10. The system of claim 8, wherein said outer wall and said spacer member define an elongated annular space for containing the gas.

11. The system of claim 8, wherein said outer wall of said conduit is formed of an electrically conductive material.

12. The system of claim 11, wherein said spacer member is formed of an electrically conductive material.

13. A corona discharge unit, comprising:

a conduit structure for connecting a gas inlet to a gas outlet, said conduit structure including first and second electrodes and a dielectric material, said dielectric material including an ozone-resistant polymer; and means for connecting said first electrode to a source of alternating current; and wherein said conduit structure includes inner and outer concentric elements, said inner and outer concentric elements including said first and second electrodes, and wherein said dielectric material is a layer of said ozone-resistant polymer surrounding said inner concentric element, said layer of polymer being substantially concentric with said outer concentric element, wherein said inner and outer elements are formed of metal, and wherein said corona discharge unit includes spacer elements in contact with said dielectric material for holding said inner concentric element in position within said outer concentric element, and wherein the interior of said inner element is sealed off such that gas flows only between said inner and outer elements from said inlet to said outlet.

14. A corona discharge unit, comprising:

a conduit structure for connecting a gas inlet to a gas outlet, said conduit structure including first and second electrodes and a dielectric material, said dielectric material including an ozone-resistant polymer; and means for connecting said first electrode to a source of alternating current; and wherein said conduit structure includes inner and outer concentric elements, said inner and outer concentric elements including said first and second electrodes, and wherein said dielectric material is a layer of said ozone-resistant polymer surrounding said inner concentric element, said layer of polymer being substantially concentric with said outer concentric element, further comprising means for supplying the alternating current to said first electrode, and means for flowing an oxygen-rich gas through said conduit from said inlet to said outlet.

15. A corona discharge unit, comprising:

a conduit structure for connecting a gas inlet to a gas outlet, said conduit structure including first and second electrodes and a dielectric material, said dielectric material including an ozone-resistant polymer; and means for connecting said first electrode to a source of alternating current; and wherein said conduit structure includes an outer wall, a spacer member, and an insulated wire, said insulated wire being located between said outer wall and said spacer member, said insulated wire being in contact with said spacer member and said outer wall, said insulated wire including said first electrode.

16. The corona discharge unit of claim 15, further comprising means for supplying the alternating current to said first electrode, and means for flowing an oxygen-rich gas through said conduit from said inlet to said outlet.

17. An electron discharge system, comprising:

a conduit for containing a fluid, said conduit including an outer wall and a spacer member located within said outer wall;

a wire located within said conduit between said outer wall and said spacer member;

a dielectric material surrounding said wire; and a source of alternating current connected to said wire for generating an electron discharge within said conduit; and wherein said dielectric material is in contact with said spacer member and said outer wall.

* * * * *